United States Patent [19]
Freiberger

[11] Patent Number: 5,400,964
[45] Date of Patent: Mar. 28, 1995

[54] INFRA-RED COMFORT SENSOR

[75] Inventor: Ronald D. Freiberger, Kokomo, Ind.

[73] Assignee: Delco Electronics Corporation, Kokomo, Ind.

[21] Appl. No.: 158,555

[22] Filed: Nov. 29, 1993

[51] Int. Cl.6 ............ G05D 23/00; G01J 5/00
[52] U.S. Cl. .................. 236/91 C; 374/132
[58] Field of Search ........... 236/51, 91 C, 1 R; 374/121, 132

[56] References Cited

U.S. PATENT DOCUMENTS

| | | | |
|---|---|---|---|
| 2,562,538 | 7/1951 | Dyer | 374/132 |
| 2,835,779 | 5/1985 | Kazan | 236/68 B |
| 4,920,759 | 5/1990 | Tanaka et al. | 62/244 |
| 5,105,366 | 4/1992 | Beckey | 364/505 |
| 5,148,977 | 9/1992 | Hibino et al. | 374/132 X |
| 5,187,943 | 2/1993 | Taniguchi et al. | 236/91 C X |

FOREIGN PATENT DOCUMENTS

0195229  8/1986  Japan ................ 374/132

*Primary Examiner*—William E. Wayner
*Attorney, Agent, or Firm*—Vincent A. Cichosz; Jimmy L. Funke

[57] ABSTRACT

A climate control system for the interior of a vehicle includes infrared sensing to measure thermal level therein and to provide a signal to the system control for establishing and maintaining the thermal level to a level preset by a vehicle occupant. The viewing field and admissibility of the infra-red sensor determines the composition of the signal by controlling the objects, surfaces, area and radiation included in the field. Appropriate selection of viewing field and admissibility integrates into the signal corrective factors for external climatic conditions and solar re-radiation within the vehicle.

5 Claims, 2 Drawing Sheets

INFRA-RED COMFORT SENSOR

BACKGROUND OF THE INVENTION

This invention relates generally to heating, ventilation and air conditioning (HVAC) systems and, more particularly, to such systems as they relate to automotive passenger compartment climate control. More specifically, this invention deals with the accurate sensing of automotive passenger compartment ambient temperature and heat energy levels wherein such sensing is necessary to establish and maintain comfort level within the passenger compartment.

It is common practice in automotive climate control to utilize passenger compartment air drawn across a temperature sensor through an aspirator hose concealed behind the instrument panel to obtain a convective measure of passenger compartment thermal level. Such systems are typically assembly intensive, subject to hardware failures such as aspirator hose disconnects and material obstruction preventing air flow. Such failures, all of which alter the air flow across the temperature sensor, tend to result in performance degradation and inaccuracy but do not result in catastrophic system failures. Consequently, passengers will feel dissatisfied with the performance of the HVAC system yet not realize that it is operating at reduced performance quality.

An automobile's instrument panel typically houses a temperature sensor over which air from the vicinity of the instrument panel is drawn. Additionally, an automobile instrument panel is a carrier for many heat generating components, such as radios, instrumentation, various electronic modules and back lighting. All of these, especially when evening driving is encountered, may result in a thermal load local to the instrument panel that is not indicative of the thermal level of the passenger compartment which is the desired temperature to be measured. This may result in false readings at the temperature sensor. However, an instrument panel remains a desirable location for sensing media.

Frequently, HVAC control systems additionally rely upon a second sensor to detect a solar load for use as a corrective control signal. Outside air temperature is often likewise utilized as another corrective control signal. These of course add complexity to the HVAC control system and in the case of a sun load sensor may be cosmetically unappealing since one is typically mounted on an upper surface of an instrument panel or is exposed therethrough.

SUMMARY OF THE INVENTION

One object of the present invention is to simplify the passenger compartment temperature sensing and concomitantly reduce failure modes associated therewith. Another object of the present invention is to reduce or eliminate local influences upon the ambient temperature sensing from heat sources in proximity thereto. Yet another object of the invention is to reduce the complexity of climate control systems by eliminating separate corrective control sensors.

Accordingly, and consistent with one embodiment of the present invention, an automotive climate control system for maintaining a passenger's comfort is provided having a single infra-red sensing means for monitoring a predetermined area within the passenger compartment. A control signal is produced therefrom which is generally representative of the passenger compartment ambient temperature. Control means are also provided which are responsive to the control signal and are effective to control an HVAC system to establish and maintain the passenger compartment ambient temperature according to a preset level. A further aspect of the invention provides for filtering of the infra-red signals so as to selectively view those wave lengths thereof which have the most significant impact upon, or are most indicative of, the ambient temperature of the passenger compartment. In addition, a further aspect of a preferred form of the present invention provides for controlling the field of view of the infra-red sensor via appropriate lensing means such that the field of view contains elements of the passenger compartment which tend to be representative of at least a predictable portion of thermal content of the passenger compartment.

DETAILED DESCRIPTION OF A PREFERRED EMBODIMENT

Figure 1:
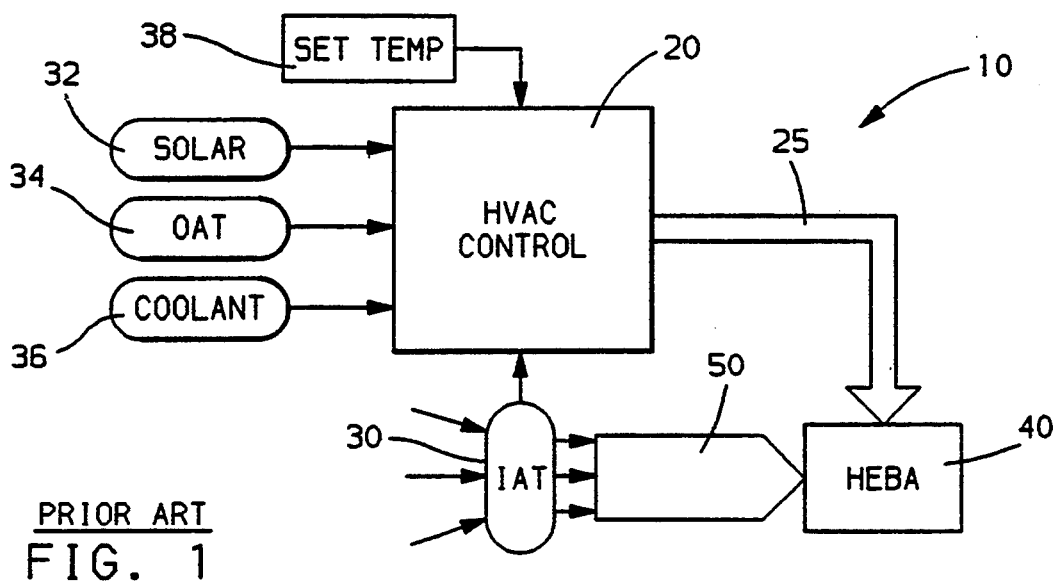
FIG. 1 shows a diagram of a prior art climate control system utilizing aspirated airflow across a temperature sensor.

Referring first to FIG. 1, a conventional vehicle climate control 10 is shown comprising a heating, ventilation and air conditioning (HVAC) control 20 comprising a conventionally known microcomputer (not illustrated) having a central processing unit, ROM, RAM, I/O ports and A/D converters which receive various analog input signals from discrete sensors 30-36 and digitize the same for use in automated control of passenger compartment thermal level. Interior air temperature (IAT) sensor 30 provides the primary input to HVAC control 20 with outside air temperature (OAT) sensor 34 and solar load (SOLAR) sensor 32 providing further signals to HVAC control 20 desirable for climate control. OAT sensor 34 provides in conjunction with IAT sensor 30 a differential measurement between the passenger compartment and the exterior environment which effects the rate of heat transfer therebetween, while SOLAR sensor 32 provides a measure of the intensity of the solar radiation on the vehicle interior which provides radiant heat within the passenger compartment. Coolant temperature (COOLANT) sensor 36 provides a signal to HVAC control 20 which is indicative of the heat capacity of the heater core. Another input to the control includes an operator selected temperature setting signal (SET TEMP) 38 corresponding to the desired thermal level. The various inputs are monitored and processed for controlling temperature maintenance functions of the heater, evaporator and blower assembly (HEBA) 40 which, as the name suggests, includes; a heater core for circulating engine coolant for warming air, an evaporator core for circulating refrigerant for cooling air, a blower or fan for circulating air through the heater and evaporator cores in proportion to the position of an air mix door as determined by solenoid operated vacuum switches or electrical motors responsive to the HVAC controller outputs 25. The position of the air mix door determines the temperature of the air circulated within HEBA 40. The HEBA often times further includes control of exiting air to passenger determined modes such as lower, upper, bi-level, defog and defrost and entering air between fresh and recirculated modes. Solenoid controlled vacuum switches responsive to HVAC outputs 25 are the most prevalent actuators used for motive control of air delivery doors effective to establish the modes as described above. Electrical motor control of air delivery doors is also practiced in the art and is equally applicable to the present invention. HEBA 40 as referenced herein encompasses air mix and air delivery doors and associated actuators whether integral therewith or comprising assemblies separate therefrom, any distinction being inconsequential to the invention. The present invention may be adapted to other forms of climate control systems which employ less conventional means of heating such as resistive and radiant heat sources.

FIG. 1 further illustrates the means by which passenger compartment air temperature is measured. In addition to IAT sensor 30 which is normally positioned behind the instrument panel (not illustrated), aspirator tube 50 (functionally illustrated) is utilized to draw passenger compartment air in the vicinity of the front of the instrument panel across IAT sensor 30 for example by connecting the remote end of the tube to a high pressure portion of HEBA 40 through a venturi arrangement to generate a small air flow. A measure of the interior air temperature is thereby obtained.

Figure 2:
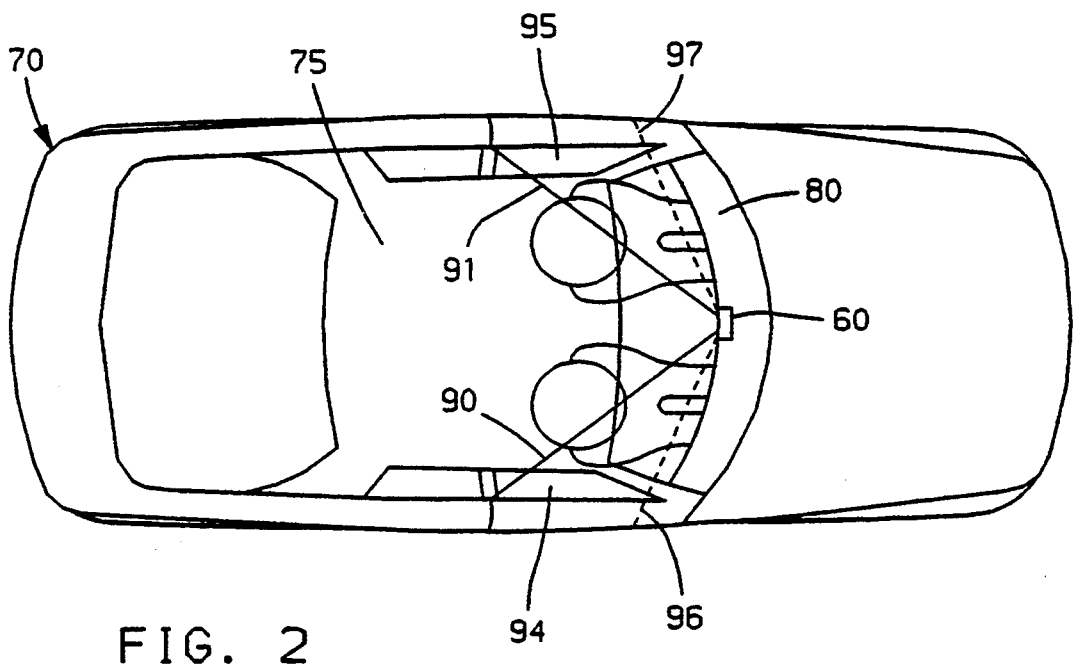
FIG. 2 illustrates in plan view the passenger compartment of a vehicle and alternative fields of view for infra-red sensing means in accordance with alternative embodiments of the present invention.

Turning to FIG. 2, a vehicle is generally designated by the numeral 70 and passenger compartment therein by the numeral 75. Infra-red (IR) sensor assembly 60 is positioned within passenger compartment 75 of the vehicle such that the viewing field is representative of predetermined portions thereof. Appropriate locations for IR sensor assembly 60 include the vehicle instrument panel 80 such that the viewing field is rear facing with respect thereto. This way, a good portion of passenger compartment 75 is within the viewing field of the sensor. In a first embodiment, IR sensor 60 has a relatively narrow field of view as illustrated in two dimensions by the passenger compartment area delimited by the solid lines 90,91 emanating from IR sensor assembly 60. In this case, IR sensor 60 views a major portion of the passenger compartment including the occupants, the seating area and the air within the passenger compartment field of view. This particular embodiment may continue to benefit from the use of an outside air temperature sensor for corrective offset since the limited viewing angle of IR sensor 60 substantially ignores exterior conditions which are desirably known for the purpose of adapting the interior climate control to the prevailing exterior climatic conditions. It may also be desirable to utilize a SOLAR sensor as conventionally practiced depending on the admissability and responsiveness of IR sensor 60 to solar re-radiation off of interior surfaces within passenger compartment 75.

Alternatively as shown in FIG. 2, IR sensor 60 may have a viewing angle which is relatively wide as illustrated by the passenger compartment area delimited by the broken lines 96,97 emanating from IR sensor 60. In this case, a portion of the vehicle interior (e.g. side glass 94,95) bearing a relationship to the exterior environment is within the viewing field of the sensor and induces corrective offset to the main passenger compartment signal thereby accounting for the prevailing exterior climatic conditions. Use of the OAT sensor for corrective offset purposes is thereby rendered superfluous. An alternative to a single IR sensor with a wide viewing angle is a plurality of IR sensors appropriately arranged to accommodate input from the passenger compartment as well as the vehicle exterior. Again as in the previous embodiment, it may be desirable to utilize a SOLAR sensor as conventionally practiced depending on the admissability and responsiveness of the chosen IR sensor(s) to solar re-radiation.

Figure 3:
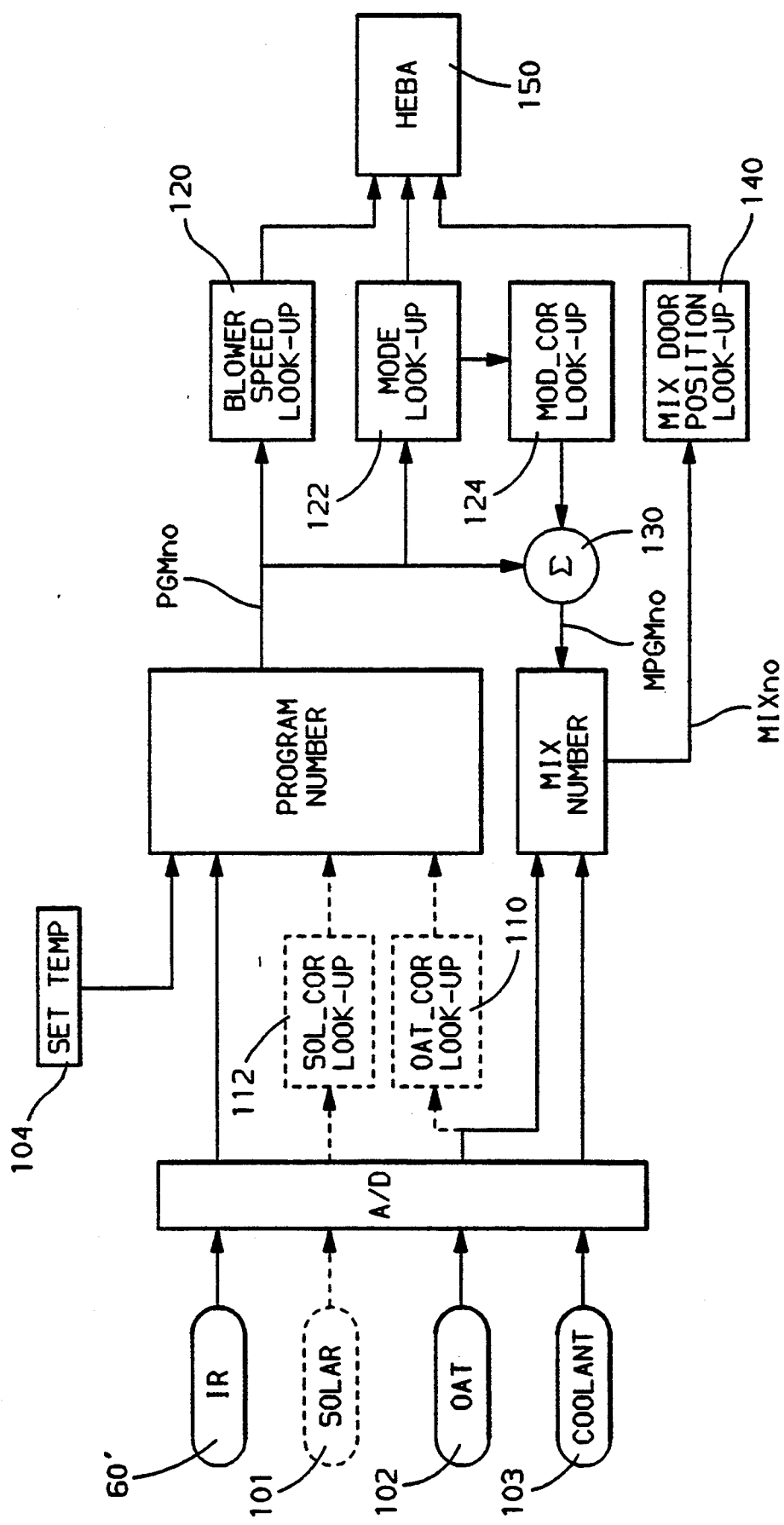
FIG. 3 shows a schematic diagram of a climate control system encompassing alternative embodiments consistent with the present invention.

Elements of the illustrated preferred climate control architecture of FIG. 3 may be substantially identical to those described in conjunction with FIG. 1. IR sensor assembly 60' is shown as an input to an HVAC control. Solar sensor SOLAR 101 and outside air temperature sensor OAT 102 are illustrated, broken lines signifying discretionary use of the corresponding sensor or sensor signal. Such use or non-use is a function of alternative embodiments within the scope of the present invention. Coolant temperature COOLANT 103 is also shown with a signal therefrom as an input to the HVAC control. Operator selected temperature setting signal SET TEMP 104 is similarly shown as an input thereto. Sensors 101-103 and 60' are assumed to produce analog signals, which signals are passed to A/D converter 110 for digitization. SET TEMP signal 104 is assumed a digital input signal commonly obtained from an instrument panel climate control operator interface at the instrument panel. Where SET TEMP signal is analog, A/D conversion can be employed to digitize the signal.

Control processing is advantageously described in terms of establishing a program number PGMno and air mix door number MIXno though other alternatives will be readily apparent to those possessing ordinary skill in the art. PGMno is established according to the following general function:

PGMno=f(SET TEMP, IR, OAT_COR, SOL_COR, K) where SET TEMP is the operator temperature setting, IR is the passenger compartment thermal level as established by the IR sensor assembly 60', OAT_COR is the outside air temperature correction factor from calibration table 110, SOL_COR is the solar radiation correction factor from calibration table 112 and K represents a calibration constant to scale PGMno into a number range compatible with the microcomputer architecture ($0 \leq PGMno \leq 255$ for 8 bit architecture). Where the IR sensor assembly is configured with sufficient view of the vehicle exterior climatic conditions and/or admits sufficient solar re-radiation, correction factors from OAT and/or SOLAR sensors 102,101 respectively may be eliminated when calculating PGMno since offsets representative thereof are contained in the composite signal delivered by the IR sensor assembly.

PGMno is then utilized to reference blower speed and mode for HEBA 150 operation such as through calibration tables 120,122 respectively. The mode is also used for the look-up from calibration table 124 of a corrective value MOD_COR associated therewith and summed with PGMno at node 130 to establish a mode corrected program number MPGMno. MIXno is established according to the following general function:

$$MIXno = f(COOL, \Delta T(COOL, T_e), MPGMno, K1, K2)$$

where COOL is the coolant temperature as established by coolant sensor 103, $T_e$ is a predetermined evaporator temperature equivalent to a fixed calibrated value when the compressor is cycling and to the ambient temperature as measured by OAT sensor 102 when the compressor is not cycling, MPGMno is the mode adjusted program number, and K1 and K2 represent calibration constants used to scale the function into a number range compatible with the microcomputer architecture ($0 \leq MIXno \leq 255$ for an 8-bit architecture).

MIXno is then utilized to select a temperature door position from the mix door position look-up table 140. This selected door position is then used in positioning the air mix door in HEBA 150.

Passenger compartment climatic conditions and exterior ambient conditions do not normally experience rapid swings and therefore the preferred IR sensor is chosen having appropriate response characteristics. Therefore, an IR sensor of preferred choice produces a signal proportional to the heat energy within its viewing field. One type of IR sensor so characterized utilizes thermopile technology.

Viewing angle of an IR sensor is determined by design of the sensor and, if inadequate for the desired viewing field, may be modified by lensing. A particularly attractive option for widening the viewing angle and minimizing dimensional penalty is to use a fresnel lens comprised of low loss material such as polyethylene.

Admissibility of the sensor to different wavelengths of electromagnetic radiation can be controlled by the material defining any lensing or non-lens windowing. Most of the energy of concern is in the ten micron wavelength range and an electromagnetic sensor designed with lensing and/or windowing providing admissability thereabout has been shown to perform adequately for providing a measure of passenger compartment thermal level. Silicon lensing windowing has been shown to provide approximately 60 percent admissibility in this range, with polyethylene lensing windowing improving this figure to approximately 90 percent. The various lensing material and/or window materials therefore provide the means by which selective wavelengths of thermal energy are filtered for inclusion or exclusion depending upon the desired measurement.

Figure 4:
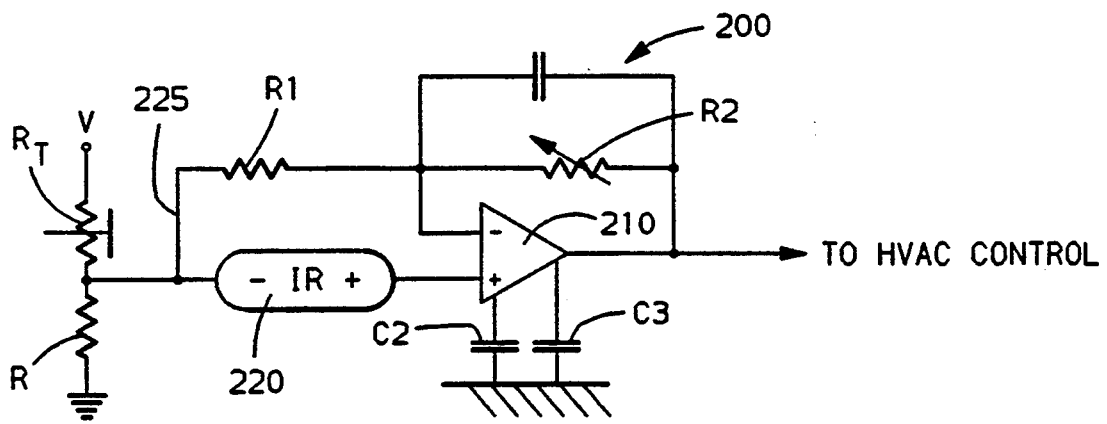
FIG. 4 is a circuital diagram of an infra-red sensor assembly for generating a temperature signal in accordance with the various embodiments of the present invention.

As previously pointed out, responsiveness to rapid heat changes is of minimal importance with regard to the choice of an IR sensor and in fact is not the preferred sensor response due to noise problems anticipated in an automotive environment. Therefore, the present embodiment utilizes an IR sensor characterized by an output voltage which is substantially proportional to heat changes. In the present embodiment, an IR sensor part number PL-82 available from Armtec/Ragen Incorporated, 10 Ammon Drive, Manchester, N.H. is utilized. This sensor is a 20 thermocouple junction device with a silicon window and produces a voltage output on the order of 45 microvolts per degree fahrenheit. It is apparent that a change in passenger compartment thermal level of several degrees therefore will only result in voltage changes on the order of tens or perhaps hundreds of microvolts, which small signals pose unique amplification challenges. A cost effective and widely available means for signal amplification meeting the needs of this embodiment is a chopper stabilized amplifier in differential mode which is innately characterized by extremely low input offset voltage thereby being responsive to the small voltage changes provided by the IR sensor chosen. An exemplary circuit 200 is set forth in FIG. 4 for accomplishing a chopper stabilized amplification of the IR sensor signal wherein chopper stabilized amplifier 210 is designated a TL2654 available from Texas Instruments, Dallas, Tex. Exemplary component values are shown but are subject to modification according to required operation. Manufacturer's data sheets may be referenced for particulars on operational parameters and external component choice.

The present embodiment is configured for non-inverting operation having the non-inverting terminal connected to the positive terminal of the IR sensor. The negative terminal of IR sensor 220 is coupled to one end of resistor R1 to establish offset node 225, the other end thereof coupled to the inverting input of the amplifier. The output of the amplifier is coupled through resistor R2 to the inverting input in feedback to establish the gain (G) of the circuit in accordance with a ratiometric relationship between R2 and R1 [$G = (R1+R2)/R1$]. Integrating capacitor C1 is preferably coupled across the inverting terminal and the output in order to stabilize the output signal. Each of the capacitors C2,C3 shown coupled to ground provides storage of a potential for nulling the amplifier offset voltage during a respective one of amplifying or nulling phases of the chopper amplifier's operation. The output of amplifier 210 comprises a conditioned IR sensor signal for input into an HVAC control. An offset voltage substantially equal to one-half the operating voltage V of the amplifier is provided at offset node 225 established between IR sensor 220 negative terminal and resistor R1 to allow operation through the entire operating voltage range. Output voltage is therefore represented by the equation:

$$V_o = V_{off} + G \cdot V_{ir}$$

where $V_o$ is the output voltage, $V_{off}$ is the offset voltage, G is the gain and $V_{ir}$ is the IR sensor voltage.

As with any thermopile device, the voltage produced between two output terminals thereof is a function of the temperature differential between a set of measuring junctions and reference junctions; and, in the present embodiment, the chosen IR sensor produces a voltage signal substantially proportional to the difference in temperature. Ideally, the reference junctions' temperature would be controlled to a known "reference" temperature, and the output voltage signal produced by the temperature differential between the reference and measuring junctions thereby would provide an absolute measure of the measuring junctions' temperature. In the present embodiment using the above exemplary IR sensor, the measuring junctions are exposed through a silicon window to the passenger compartment infra-red radiation content, and the reference junctions are shielded therefrom so as to remain immune to thermal influences attributed thereto. The reference junctions' temperature is not controlled, however, and will naturally tend toward a temperature in accordance with thermal influences apart from the infra-red radiation content of the passenger compartment from which they are shielded. These influences include convection from passenger compartment and instrument panel air and conduction from mounting means for the IR sensor and resistive heating of the junctions due to current flow therethrough. For example, absent control of the reference junctions' temperature, the sensor output will: 1) approach zero in the case where the reference junctions tend toward the passenger compartment thermal level as "seen" by the measuring junctions, or; 2) approach an offset in the case where the reference junctions tend toward some dominant local thermal influence such as a proximate incandescent light source. It is not practical to control the reference junction temperature, however, it is practical to compensate for thermal effects thereon. Without compensation the sensor output is indicative only of the temperature differential between the two sets of junctions and not the absolute temperature of the passenger compartment.

The present embodiment therefore provides a compensation to the offset voltage applied at the offset node by using a thermistor $R_T$ as the upper leg of a voltage divider ($R_T$, R) supplying the offset voltage $V_{off}$. The thermistor measures the temperature at the reference junctions, its negative coefficient of resistance causing adjustment to offset voltage $V_{off}$ in proportion to the temperature change thereat and preferably in negative exactitude with the uncompensated change in output voltage $V_o$ to null the effects of varying reference junction temperature from whatever influence. Therefore, the gain G as determined by the resistor pair $R_2$ and $R_1$ is chosen to produce this desired relationship whereby each unit of temperature change at the reference junctions produces a change to the term $V_{off}$ which is balanced by the change in the term $V_{ir}$ multiplied by the gain G. The placement of the thermistor should be immediately adjacent the reference junctions to provide accurate compensation and is preferably packaged integral with the IR sensor.

While the invention has been exemplified with respect to preferred embodiments as disclosed herein, it is contemplated that various modifications and alterations will be apparent to one having ordinary skill in the art and therefore the embodiments are intended to be taken by way of example and not limitation. Accordingly, the invention is intended to embrace all alternatives, modifications and variations which are within the scope of the appended claims.

The embodiments of the invention in which an exclusive property or privilege is claimed are defined as follows:

1. An automotive climate control system for establishing and maintaining a passenger compartment thermal level according to a preset level comprising in combination:

infra-red sensing means for viewing a predetermined portion of the passenger compartment for radiant heat therein, said infra-red sensing means comprising an infra-red sensor characterized by an output proportional to the thermal level of said viewed portion and amplification means characterized by low input offset voltage for amplifying said output signal to produce said control signal;

a control signal produced by said infra-red sensing means substantially representative of passenger compartment thermal level; and control means responsive to said control signal for controlling an HVAC system to establish and maintain the passenger compartment thermal level according to the preset level.

2. An automotive climate control system according to claim 1 wherein said amplification means comprises a chopper stabilized amplifier.

3. An automotive climate control system according to claim 1 wherein said infra-red sensing means comprises an infra-red thermopile.

4. An automotive climate control system for establishing and maintaining a passenger compartment thermal level according to a preset level comprising in combination:

electromagnetic sensing means having a predetermined field of view, said viewing field including a first portion of said passenger compartment indicative of thermal level therein and a second portion of said passenger compartment indicative of the thermal level external thereto;

filter means for allowing passage of selective wavelengths of electromagnetic radiation to said electromagnetic sensing means;

a composite signal produced by said electromagnetic sensing means substantially representative of passenger compartment thermal level and solar load upon the passenger compartment; and control means responsive to said composite signal for controlling an HVAC system to establish and maintain the passenger compartment thermal level according to the preset level.

5. An automotive climate control system for establishing and maintaining a passenger compartment thermal level according to a present level according to claim 5 wherein said filter means allows passage of solar re-radiation from passenger compartment surfaces, said composite signal thereby additionally being representative of a solar load upon the passenger compartment.

* * * * *